United States Patent
Cheng et al.

(10) Patent No.: US 8,950,279 B2
(45) Date of Patent: Feb. 10, 2015

(54) LINEAR ACTUATOR

(75) Inventors: Chih-Hung Cheng, Taichung (TW); Wei-Ming Huang, Taichung (TW)

(73) Assignee: JUF Motor Co., Ltd., Taichung (TW)

( * ) Notice: Subject to any disclaimer, the term of this patent is extended or adjusted under 35 U.S.C. 154(b) by 286 days.

(21) Appl. No.: 13/542,583

(22) Filed: Jul. 5, 2012

(65) Prior Publication Data
US 2013/0298707 A1    Nov. 14, 2013

(30) Foreign Application Priority Data
May 10, 2012  (TW) .............................. 101116698 A

(51) Int. Cl.
F16H 19/02    (2006.01)

(52) U.S. Cl.
USPC .............................. 74/89.37; 74/89.14; 74/425

(58) Field of Classification Search
CPC .......... F16H 25/2015; F16H 2025/209; F16H 25/2021
USPC ............ 74/89.23, 89.37, 89.38, 89.39, 89.14, 74/424.71, 425
See application file for complete search history.

(56) References Cited

U.S. PATENT DOCUMENTS

| | | | |
|---|---|---|---|
| 3,148,558 A * | 9/1964 | Stevens ............................. | 74/395 |
| 3,222,955 A * | 12/1965 | Ross et al. ....................... | 74/826 |
| 3,277,734 A * | 10/1966 | Bernard .......................... | 74/335 |
| 3,461,736 A * | 8/1969 | Curran .......................... | 74/89.31 |
| 3,504,555 A * | 4/1970 | Fry .............................. | 74/89.37 |
| 3,716,110 A * | 2/1973 | Fonda ........................... | 180/405 |
| 3,765,260 A * | 10/1973 | Lucas et al. ..................... | 74/405 |
| 4,041,793 A * | 8/1977 | Repay et al. ................ | 74/424.95 |
| 4,482,211 A * | 11/1984 | Fisher ........................... | 359/877 |
| 4,760,989 A * | 8/1988 | Elliott et al. ............. | 251/129.03 |
| 5,002,172 A * | 3/1991 | Stringer ..................... | 192/142 R |
| 5,117,701 A * | 6/1992 | Thuries et al. ............... | 74/89.24 |
| 6,321,611 B1 * | 11/2001 | Szu et al. ...................... | 74/89.37 |
| 6,431,317 B1 * | 8/2002 | Coe .............................. | 185/40 R |
| 8,109,164 B2 * | 2/2012 | Tseng et al. ................. | 74/89.37 |
| 2009/0293655 A1 * | 12/2009 | Tseng et al. ................. | 74/89.37 |
| 2011/0100141 A1 * | 5/2011 | Inoue et al. ....................... | 74/25 |
| 2012/0255380 A1 * | 10/2012 | Wu ............................... | 74/89.37 |
| 2013/0008270 A1 * | 1/2013 | Giovannone et al. ......... | 74/89.37 |

FOREIGN PATENT DOCUMENTS

| | | |
|---|---|---|
| TW | M247738 | 10/2004 |
| TW | M369950 | 12/2009 |

* cited by examiner

*Primary Examiner* — David M Fenstermacher

(57) ABSTRACT

A linear actuator includes a motor, a movable unit, and a stroke control unit. The motor includes a spindle. The movable unit includes a worm gear and a rotary shaft. The worm is provided with annular spiral or helix teeth. The stroke control unit includes at least one transmission member and at least one micro switch. The at least one transmission member is engaged with and driven by the spiral or the helix teeth of the movable unit for synchronical rotation to activating or deactivating the micro switch. In this way, the linear actuator is simplified in structure and reduced in volume.

2 Claims, 7 Drawing Sheets

LINEAR ACTUATOR

BACKGROUND OF THE INVENTION

1. Field of the Invention

The present invention relates generally to an actuator, and more particularly, to a compact linear actuator.

2. Description of the Related Art

It has become common prior art that a device based on linear transmission stroke, which is hereinafter referred to as "linear actuator", is applied to the massage chair, electric chair, electric sickbed, treadmill, collapsible bed, furniture, and lifting mechanism for position adjustment. At least one micro switch is needed to function as controlling the back and forth paths of the linear stroke and the micro switches are mounted to the start and end points of the linear stroke separately. When the linear actuator is moved along the forth path of the linear stroke and touches the micro switch of the end point, the transmission bar is restrictedly no longer moved along the forth path. Relatively, if the linear actuator touches the micro switch located at the start point while moved along the back path, the transmission bar is restrictedly no longer moved along the back path. In this way, a linear reciprocating motion between two points is available, e.g. Taiwan Patent No. M247738.

Referring to Taiwan Patent No. M369950 disclosing a pushrod, where the micro switches are located are different from those of the aforesaid patent. In this patent, the pushrod is composed of a motor, a movable unit, and a stroke control unit. The motor provides power source. The movable unit includes a rotary shaft and a driven member. The stroke control unit includes a timing gear set and at least one micro switch. In operation, the spindle of the motor drives a transmission gear and the timing gear set to enable the transmission gear to drive the rotary shaft of the movable unit for rotation to allow the driven member to move straight along the axial direction of the rotary shaft; the timing gear set forces the micro switch to control rotation of the spindle of the motor to further limit the maximum distance of movement of the driven member, thus preventing the driven member from movement beyond the maximum distance In Taiwan Patent No. M369950, the pushrod needs the transmission gear set composed of numerous small gears to be driven to function as linearly moving the driven member and operating the micro switch, so the gearbox is huge. In Taiwan Patent No. M247738, the transmission gear set is though not adopted and the micro switch is though hidden straight inside the dustproof sleeve, but it can still make the dustproof sleeve bigger. Thus, the drawbacks of the linear actuators of the aforesaid patents lie in that the gears are excessive, the installation is complicated, and it is difficult to reduce the size, so further improvement is needed.

SUMMARY OF THE INVENTION

The primary objective of the present invention is to provide a linear actuator, which is simplified in structure and reduced in volume.

The foregoing objective of the present invention is attained by the linear actuator composed of a motor, a movable unit, and a stroke control unit. The motor includes a spindle. The movable unit includes a worm gear and a rotary shaft. The worm is provided with annular teeth, such as spiral teeth or helix teeth. In operation, the spindle of the motor can drive rotation of the worm gear and then the worm gear drives rotation of the rotary shaft. The stroke control unit includes at least one transmission member and at least one micro switch. The at least one transmission member is engaged with and driven by the spiral teeth or the helix teeth of the movable unit to rotate for activating or deactivating the micro switch.

DETAILED DESCRIPTION OF PREFERRED EMBODIMENTS

Figure 1:
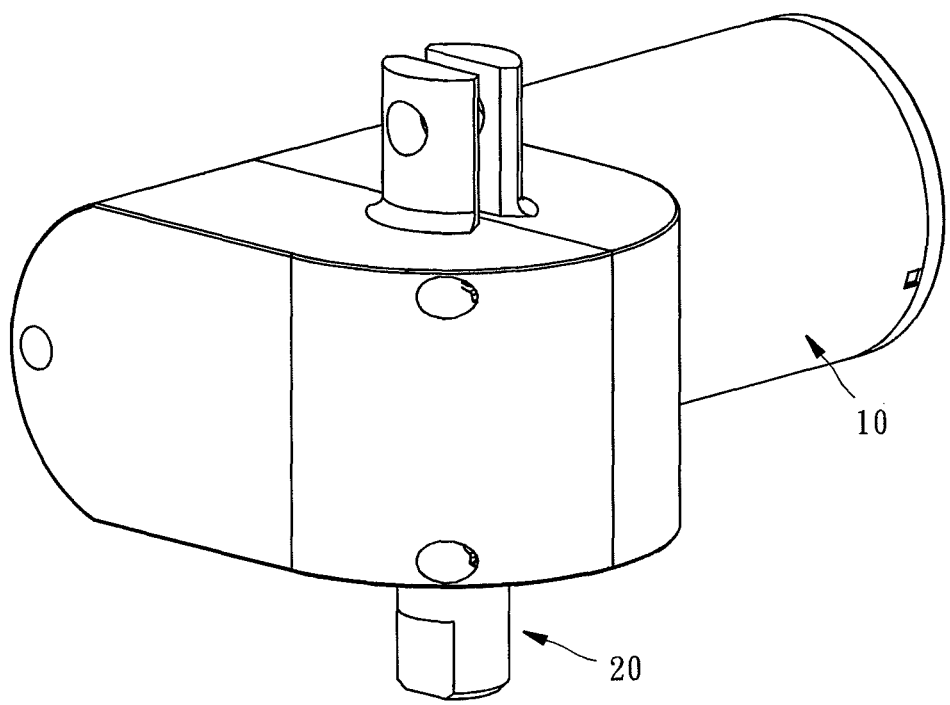
FIG. 1 is a perspective view of a first preferred embodiment of the present invention.
Figure 2:
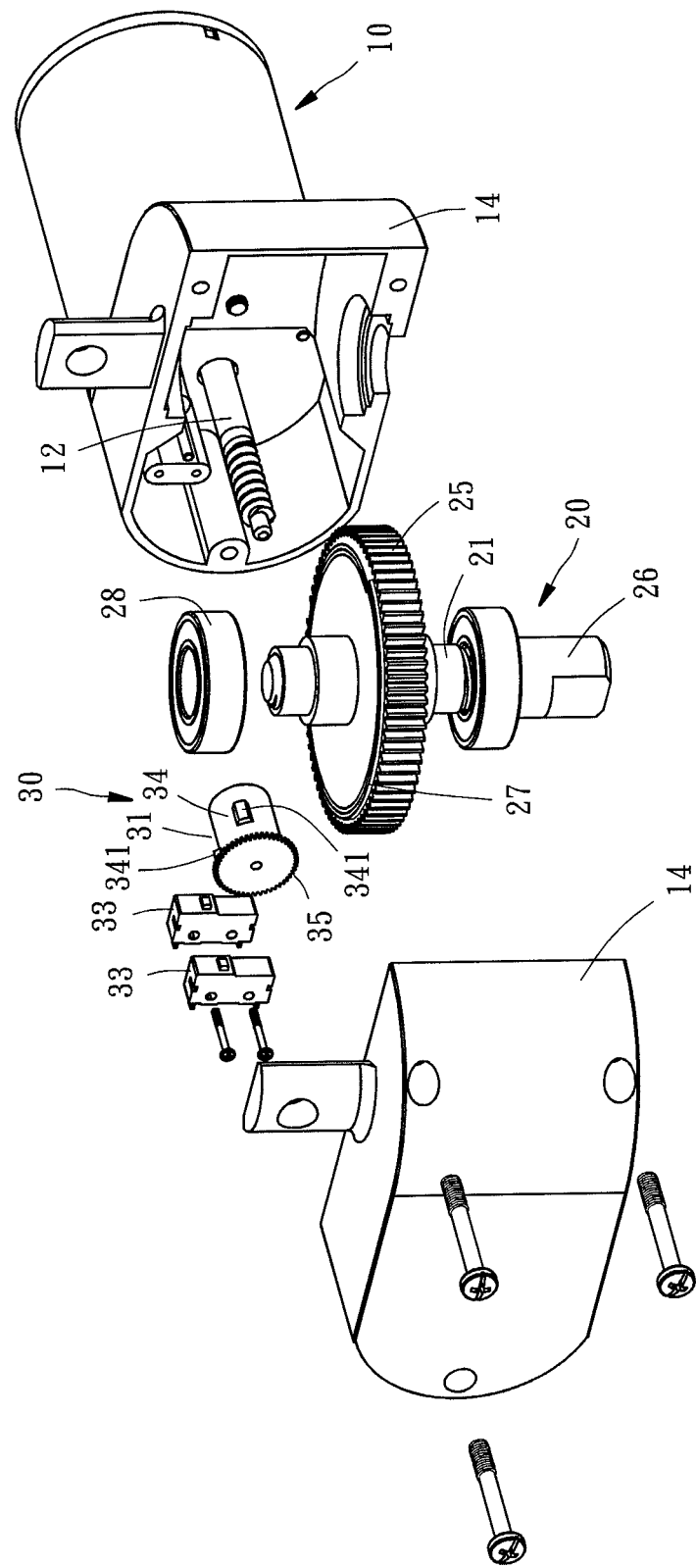
FIG. 2 is an exploded view of the first preferred embodiment of the present invention.
Figure 3:
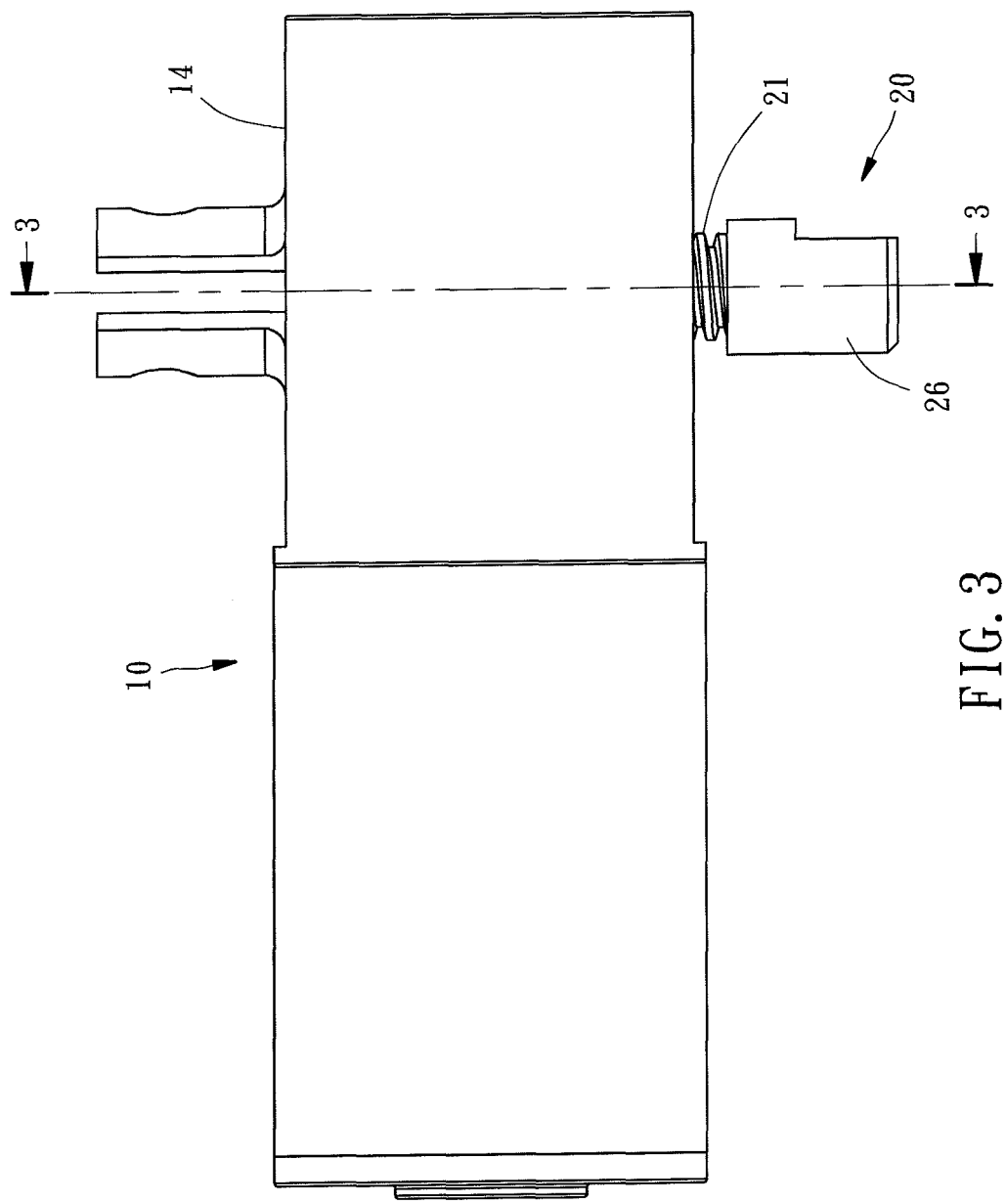
FIG. 3 is a plane view of the first preferred embodiment of the present invention.
Figure 4:
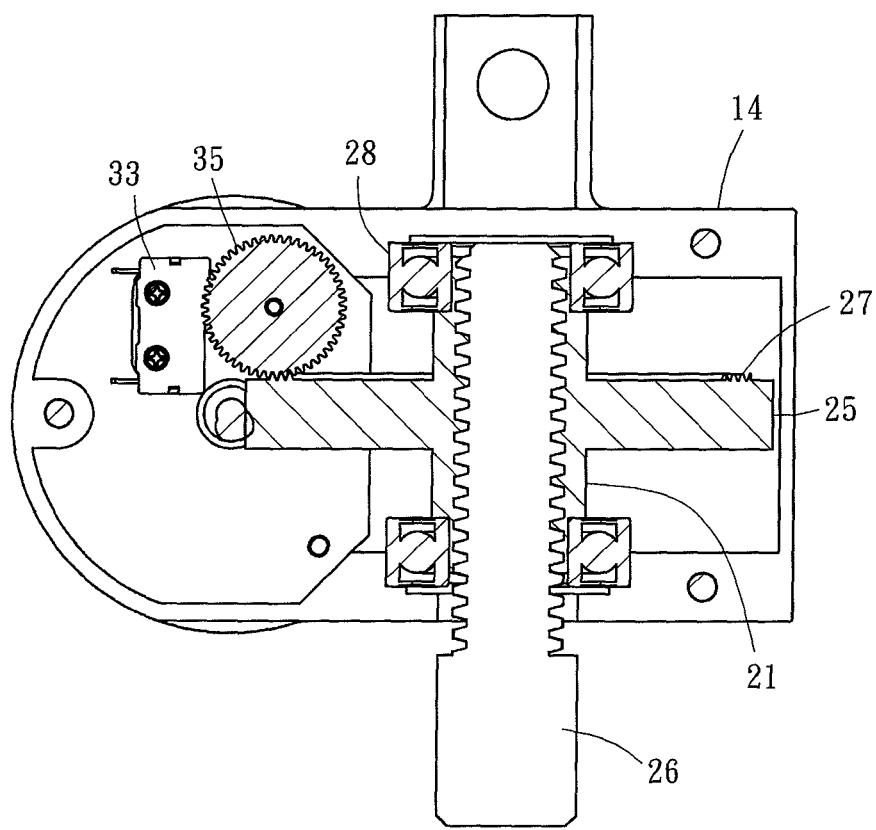
FIG. 4 is a sectional view taken along a line 3-3 indicated in FIG. 3, illustrating the connection between the spiral teeth of the worm gear and the stroke control unit.

Referring to FIGS. 1-4, a linear actuator constructed according to a first preferred embodiment of the present invention is composed of a motor 10, a movable unit 20, and a stroke control unit 30. The detailed descriptions and operations of these elements as well as their interrelations are recited in the respective paragraphs as follows.

The motor 10 includes a spindle 12 and a gearbox holder 14 encompassing the spindle 12. In this embodiment, the spindle 12 is a worm.

The movable unit 20 includes a worm gear 25, an output shaft 21, and a driven member 26. The worm gear 25 is provided with transversal annular teeth formed on an upper surface thereof provided with none of any teeth. In this embodiment, the transversal annular teeth are spiral teeth 27, and the output shaft 21 is a threaded shaft and can be driven by the worm gear 25 for rotation in situ. The driven member 21 is engaged with an external periphery of the output shaft 21 and is though a rotatable linkage in this embodiment, but it is not limited thereto and can also function as a sleeve that is linearly movable as an alternative. The movable unit 20 includes two bearings 28 mounted to the gearbox holder 15 to enable the worm gear 25 to be rotatable in situ inside the gearbox holder 14 and enable the spindle 12 to be engaged with the worm gear 25. When the spindle 12 is driven for rotation, the worm gear 25 can be driven for decelerated rotation to further drive rotation of the output shaft 21 in such a way that the driven member can be rotated synchronically or moved linearly.

The stoke control unit 30 includes a transmission member 31 and two micro switches 33. The transmission member 31 has a cylindrical body 34 and is provided with two convexities 341 and annular teeth 35; the convexities 341 are formed on a peripheral surface of the cylindrical body 34. The annular teeth 35 are formed on an end surface of the cylindrical body 34 for engagement and linking-up with the spiral teeth 27 of the worm gear 25 and then the transmission member 31 can synchronically on it own axis along with the rotation of the spiral teeth 27 for rotation of the two convexities 341 in such a way that the two convexities 341 can touch the micro switches 33 separately. In other words, the stroke control unit 30 is mounted inside the gearbox holder 14 of the motor 30 and the annular teeth 35 of the transmission member 31 is engaged with the spiral teeth of the worm gear 25 to enable the output shaft 21 to drive rotation of the transmission member 31 relative to the rotation thereof. Once either of the convexities 341 touches the corresponding micro switch 33, the spindle 12 of the motor 10 can be controlled for rotation or stop.

When the spindle 12 drives the output shaft 21 for rotation by means of the worm gear 25 to enable the driven member 26 at one end of the output shaft 21 for synchronical rotation or linear movement, the spiral teeth 27 of the worm gear 25 drives rotation or linear movement of the transmission member 31 via the annular teeth 35 in such a way that the convexities 341 can touch the corresponding micro switch 44 for activation or deactivation while being rotated for a predetermined angle.

Figure 5:
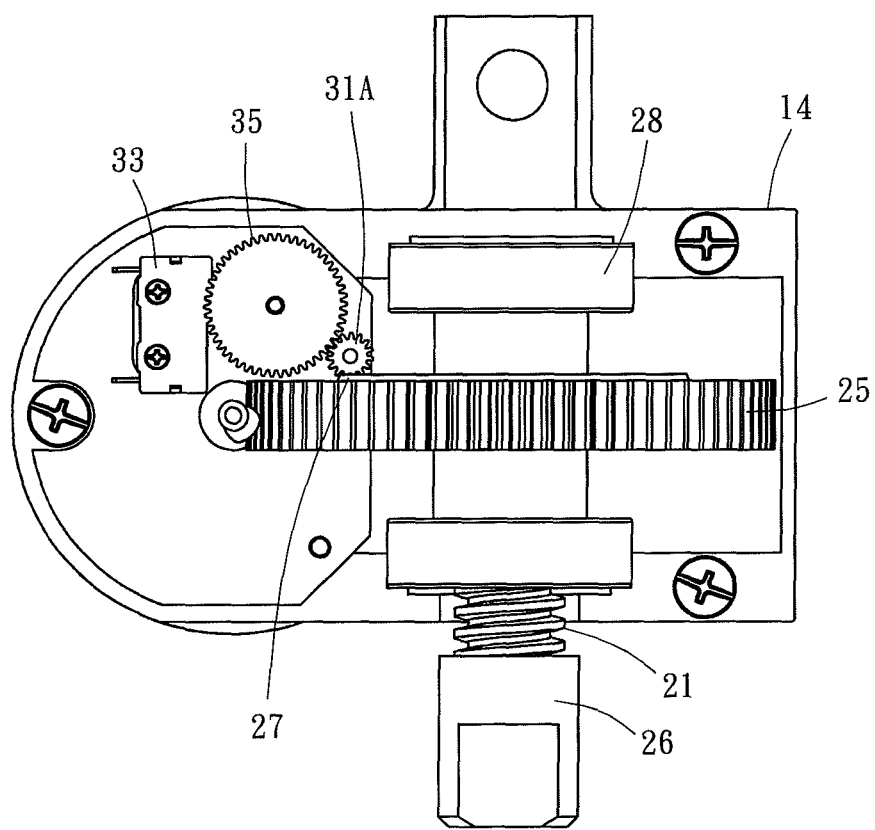
FIG. 5 is a sectional view of a second preferred embodiment of the present invention, illustrating that the stroke control unit includes two transmission members.

Next, referring to FIG. 5, a linear actuator of a second preferred embodiment of the present invention is similar to that of the first embodiment, having the following difference. The linear actuator of the second embodiment further includes a transmission member 31A smaller than the transmission member 31 of the first embodiment. The transmission member 31A can function as an intermediate between the spiral teeth 27 and the transmission member 31, thus providing an alternative for the connection between the transmission member 31 and the spiral teeth 27.

Figure 6:
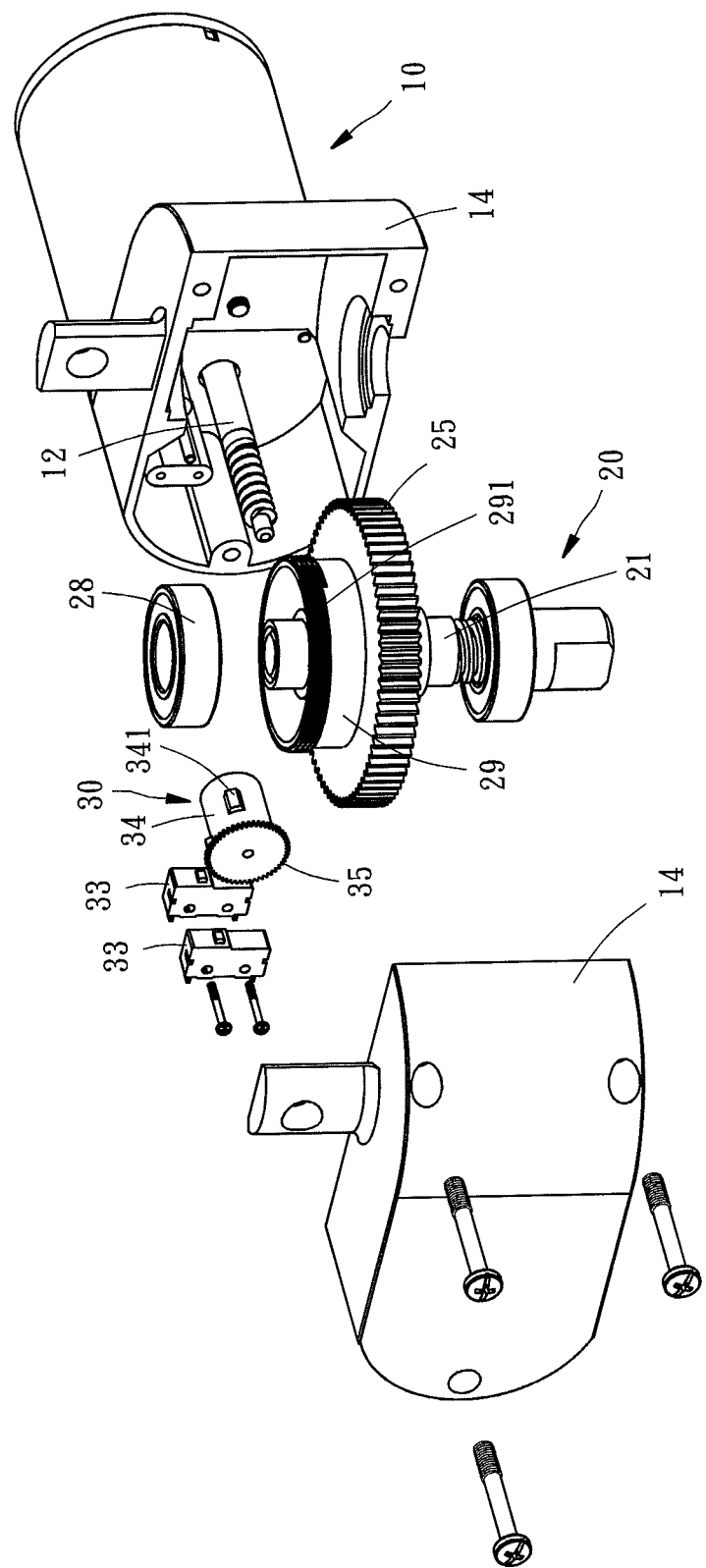
FIG. 6 is an exploded view of a third preferred embodiment of the present invention.
Figure 7:
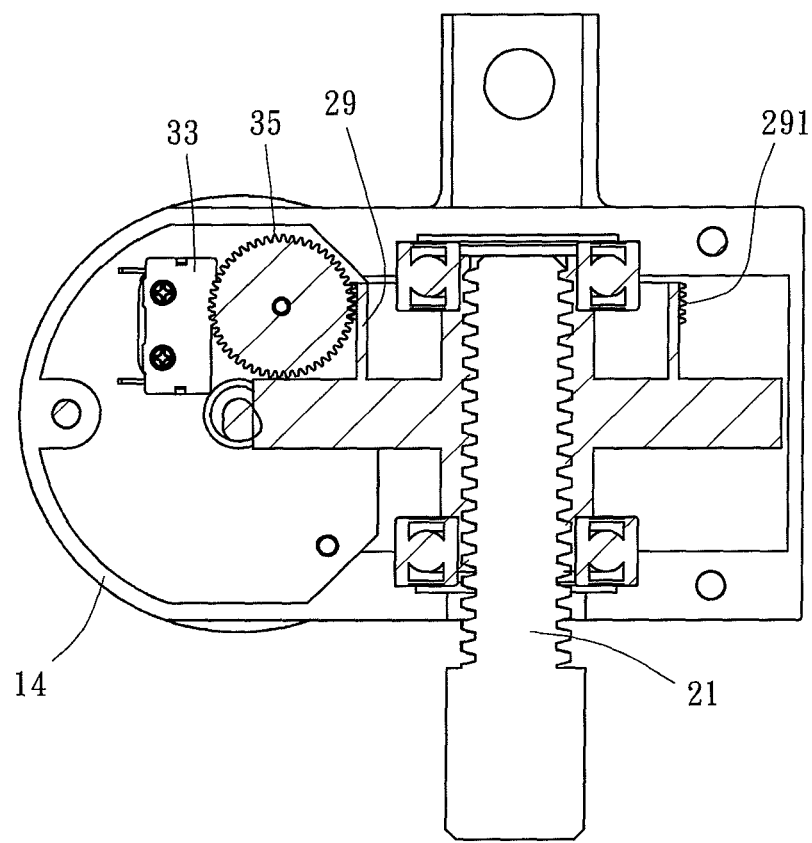
FIG. 7 is a sectional view of the third preferred embodiment of the present invention, illustrating the connection between the helix teeth of the worm gear and the stroke control unit.

Referring to FIGS. 6-7, a linear actuator of a third preferred embodiment of the present invention is similar to that of the first embodiment, having the following difference. The linear actuator of the third embodiment further includes an annular sleeve 29 coaxially with the output shaft 21 and mounted to one side of the worm gear 25. The annular sleeve 28 is provided with an external spiral teeth axially formed on an external periphery thereof. In this way, the annular teeth 35 of the transmission member 30 can be engaged with the external spiral teeth 291 to enable the third embodiment to reach the same function as the first embodiment does.

It is to be noted that the spiral teeth 27 in each of the first and second embodiments is an example for illustration only and it not limited to such structure. In other words, the helix teeth 291 indicated in the third embodiment can take place of the spiral teeth 27 as an interchangeable equivalent.

In conclusion, the present invention includes the simplified design of the worm gear 25 provided with the spiral teeth 27 or the helix teeth 291 instead of the complicated design of the conventional linear actuator formed of gears for driving the transmission member 30 for linkage in such a way that the size of the linear actuator can be reduced.

Although the present invention has been described with respect to a specific preferred embodiment thereof, it is in no way limited to the specifics of the illustrated structures but changes and modifications may be made within the scope of the appended claims.

What is claimed is:

1. A linear actuator comprising:
a motor, a movable unit, and a stroke control unit, the motor having a spindle, the movable unit having a worm gear and a rotary shaft, the stroke control unit having at least one transmission member and at least one micro switch, the linear actuator being characterized in that:
the worm gear having annular teeth for engagement with the stroke control unit, the transmission member being driven by the annular teeth to operate the micro switch for activation or deactivation of the motor;
wherein the transmission member comprises a cylindrical body, at least one convexity formed on a periphery thereof and corresponding to the micro switch in number, and an annular teeth portion formed on an end of the cylindrical body for engagement with the annular teeth of the worm gear;
wherein the annular teeth of the worm gear are spiral or helix.

2. The linear actuator as defined in claim 1 further comprising an annular sleeve and annular teeth, wherein the annular sleeve is coaxially with the output shaft and mounted to the worm gear where no teeth are provided, and an annular teeth is formed on a peripheral edge of the annular sleeve.

\* \* \* \* \*